United States Patent

[11] 3,586,978

[72] Inventor Duyck Van Gorder
Elmhurst, Ill.
[21] Appl. No. 816,232
[22] Filed Apr. 15, 1969
[45] Patented June 22, 1971
[73] Assignee GTE Automatic Electric Laboratories, Incorporated
Northlake, Ill.

[54] TOUCH CALLING RADIO TELEPHONE TERMINAL
7 Claims, 5 Drawing Figs.

[52] U.S. Cl. 325/55, 385/64, 325/117, 179/41 A
[51] Int. Cl. H04b 5/04, H04j 1/14
[50] Field of Search 179/41 A; 325/16, 53, 54, 55, 64, 117, 111, 314, 361

[56] References Cited

UNITED STATES PATENTS

| | | | |
|---|---|---|---|
| 2,575,782 | 11/1951 | Bartelink | 179/41 A |
| 3,041,402 | 6/1962 | Dimmer | 179/41 A |
| 3,087,998 | 4/1963 | Stewart et al. | 179/41 A |
| 3,105,118 | 9/1963 | Berglund | 325/53 |
| 3,377,435 | 4/1968 | Lippert | 179/41 A |
| 3,458,664 | 7/1969 | Adlhoch et al. | 179/41 A |

*Primary Examiner*—Richard Murray
*Assistant Examiner*—James A. Brodsky
*Attorneys*—Cyril A. Krenzer, K. Mullerheim, B. E. Franz and Robert J. Black

ABSTRACT: A circuit designed to provide an interface between a private automatic telephone exchange and a base radio station serving mobile radio units equipped with touch calling units. The base radio equipment normally acts as a repeater station between mobile units, when not handling calls between the mobile radio units and the telephone system. Touch calling selection by mobile radio units of telephone stations and dial access by telephone stations of radio equipment with voice paging of individual mobile radio units is included.

INVENTOR.
DUYCK VAN GORDER

BY

AGENT

PATENTED JUN 22 1971 3,586,978

SHEET 3 OF 4

TOUCH CALLING RADIO TELEPHONE TERMINAL

BACKGROUND OF THE INVENTION

1. Field of the Invention

This invention relates to new and useful improvements in terminal circuitry for mobile radio telephone systems and particularly to circuitry for interconnecting mobile radio units equipped with touch calling units to dial operated private telephone exchanges.

2. Description of the Prior Art

Mobile radio telephone systems are well known. It is also well known to employ selective signaling arrangements whereby mobile radio telephone users can effect direct connection to users of an associated dial telephone system. Systems of this type are disclosed in U.S. Pat. No. 3,041,402 and No. 3,050,591 to Robert P. Dimmer. A system employing pushbutton signaling or touch calling as it is referred to here, in mobile radio units is referred to in an article by J. L. Stepan entitled *Mobile Telephone Terminal for One or Two Radio Channels*, in "Electrical Communication" Vol. 43, No. 3. The use of simplified inexpensive terminal circuitry as disclosed herein that includes touch calling selection of telephone subscribers and paging of mobile subscribers is not disclosed in the prior art.

SUMMARY OF THE INVENTION

To provide interconnection between a dial telephone system and radio equipped mobile units, special circuitry referred to as terminal circuitry, is required. The present terminal equipment provides these facilities permitting mobile radio units equipped with touch calling devices, to selectively access any of the stations of an associated dial telephone system. The present equipment also permits mobile-to-mobile communication on an extended basis by allowing radio equipment associated with the terminal to function as a repeater when not employed for communication between telephone stations and mobile radio units. Dial telephone stations access the radio equipment associated with the terminal, and page desired mobile radio units.

With this arrangement a simple and relatively inexpensive means for providing connections between a privately owned telephone system and associated mobile radio system is provided. While not intended as a replacement for conventional mobile radio telephone terminals it would find use by businesses operating mobile radio systems and likewise having internal automatic telephone systems. The present system described makes use of twelve button "touch-calling" units at each mobile unit, with ten buttons used for the digits 1 through 9, plus 0 and the 11th and 12th pushbuttons used for transmission of connect and disconnect signals. Access to the radio telephone terminal from an associated operator's attendant cabinet is also provided if desired. While essentially a single channel system, either simplex or duplex operation of the radio facilities may be employed.

BRIEF DESCRIPTION OF THE DRAWINGS

FIGS. 2, 3 and 4 are to be arranged for a best understanding of the present invention.

DESCRIPTION OF THE PREFERRED EMBODIMENT

Figure 1:
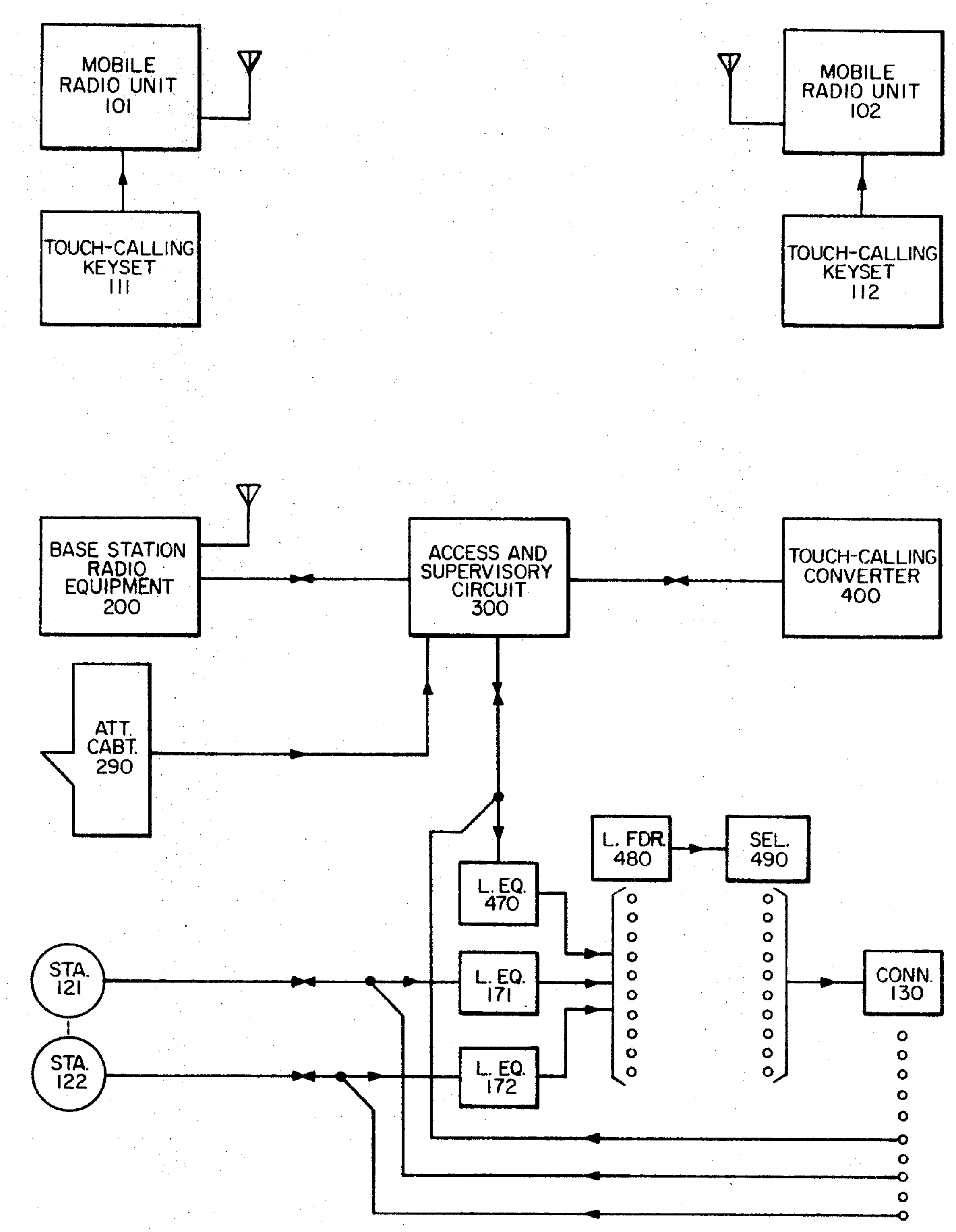
FIG. 1 is a block diagram of an automatic telephone system and associated mobile radio system connected by means of terminal circuitry in accordance with the present invention.

Referring to FIG. 1 a group of mobile radio units represented by mobile radio equipments 101 and 102 are shown. Each of these units is equipped with an associated touch-calling key set such as 111 or 112. Radio telephone terminal circuitry consisting of base station radio equipment 200 access and supervisory circuit 300 and touch-calling converter circuit 400 are provided as the interface between the mobile radio equipment and an automatic telephone system. The automatic telephone system shown in FIG. 1 is of conventional form employing a group of stations including stations 121 and 122, associated line equipment such as 171 and 172, a line finder such as 480, a selector such as 490, and a connector 130. Also shown in FIG. 1 is an attendant cabinet 290 connected to access and supervisory circuit 300. Each of the telephone stations associated with the dial telephone system such as 121 and 122, are equipped with a dial of conventional construction.

The radio equipment employed in the present system is conventional in nature and may be similar to that manufactured by Motorola, Incorporated under the names "Motran" or "-Motrac". With each mobile radio unit it has been noted that a touch-calling keyset is employed. These units are conventional in nature and may be similar to that equipment manufactured by Automatic Electric Company and referred to as a Type 1 touch calling unit adapter.

The Type 1 touch-calling unit adapter is a 12-button touch calling unit designed to provide touch-calling multifrequency end-to-end signaling capabilities. It includes tone generator circuitry operated in response to the operation of a pushbutton to cause a pair of distinct tones which represent the associated digit connect or disconnect function to be generated. When a pushbutton is depressed two pair of "make" contacts close to select the two tones, one from a low group of four frequencies, and one from a high group of four frequencies. All frequencies are generated by a single transistor oscillating at two frequencies and using two separate tank circuits to determine the frequencies of oscillation. The use of tapped transformers makes each circuit capable of producing four frequencies. The tone output of the circuit is coupled to the radio set modulator for transmission.

Telephone Station to Telephone Station Calls

Reviewing the operation of the telephone system briefly, a user at station 121 upon removing the telephone handset from the associated hookswitch, will cause through its associated line equipment 171, the line finder 480 to search for an idle line. As soon as this connection is established through the line finder bank, dial tone is returned to the user at station 121. At this time he will operate his dial, controlling selector 490 to access a connector such as connector 130. Further dial pulses will cause connector 130 to seek the appropriate level and terminal on its associated bank to establish a connection to another telephone such as station 122.

Mobile Unit to Mobile Unit Calls

Now assuming a mobile unit such as 101 wishes to converse with another mobile radio unit such as 102, the user at mobile radio unit 101 will operate his transmitter by operating a push-to-talk button on his microphone, directly calling the desired mobile radio unit. In the present system a single channel full duplex system is shown. Signals transmitted from mobile unit 101 will be picked up by base station radio equipment 200 and rebroadcast by the base station equipment (which may be of higher power capacity), to the receiver portion of mobile radio unit 102. Acknowledgement by mobile radio unit 102 is also handled in conventional manner with the user at mobile unit 102 replying by placing his transmitter on the air under the control of a push-to-talk switch associated with his microphone.

The necessary circuitry for providing automatic telephone to automatic telephone connections and mobile unit to mobile unit connections, have not been shown in detail inasmuch as they are completely conventional in nature and do not form a part of the present invention.

Telephone Station to Mobile Unit Calls

Assuming now that the user at telephone station 121 wishes to converse with the user of mobile radio unit 101, he will remove his handset from the associated hookswitch in conventional manner, with dial tone being returned when line finder 480 has effectively discovered the calling status of station 121. At this time station 121 will dial the appropriate access code to establish a connection to access and supervisory circuit 300. By means of the appropriate code a connection will be established through selector 490 and connector 130 to the access and supervisory circuit 300. The access and supervisory circuit then recognizes the normal telephone system ringing signal, and in response to this ringing signal establishes a talking path between the access and supervisory circuit 300 and the base station radio equipment 200. This operation also modifies the base station radio equipment's operation from that of repeater, to terminal type operation. Access of the attendant cabinet 290 to the access and supervisory circuit 300 is also marked as busy at this time.

The user of station 121 then calls for the desired mobile radio unit. At the called station, the mobile user hearing the page, will depress the connect button that forms a portion of his touch-calling keyset such as 111 to transmit a burst of tone acting as a connect signal, which will be received by the base station radio equipment and provide answering supervision to the automatic telephone equipment. Conversation may now commence between the telephone user and the mobile radio user.

At completion of the call, the mobile radio user will operate the disconnect button that forms a portion of his touch-calling keyset, causing a burst of disconnect tone to be transmitted to the base radio telephone terminal. The base station radio equipment 200 receiving this signal will cause the associated access and supervisory circuit 300 to release the connection to the telephone system, restore the radio equipment to repeater type operation, and mark idle the access from the associated attendant cabinet 290.

Mobile Unit to Telephone Station Calls

When a call is initiated by a mobile unit such as 101 for a call to one of the stations associated with the automatic telephone system, the mobile user first monitors the radio channel for an idle condition. If the system is idle he depresses the connect button which is a portion of his touch-calling keyset, such as 111, causing a burst of connect tone to be transmitted via the mobile radio equipment to the base station radio equipment 200, for connection to the access and supervisory circuit 300. Upon recognition of the connect tone the access and supervisory circuit 300 will seize associated line equipment 470 and transfer the base station radio equipment 200 from repeater to terminal type operation and provide a busy indication to the associated attendant's position 290 (if required).

The access and supervisory circuit 300 upon recognition that line finder 480 has discovered the calling status of line equipment 470 is ready to accept dial pulses for the telephone system, seizes the associated touch-calling converter 400 and returns dial tone to the mobile user, indicating the mobile may now commence dialing. The mobile user will then operate his touch-calling keyset, such as 111. The touch-calling tone signals will then be transmitted by the mobile radio equipment 101 and received at base station radio equipment 200 and extended through access and supervisory circuit 300 to touch-calling converter 400.

In the touch-calling converter 400 the signals will be converted and resent as DC dial pulses through the access and supervisory circuit 300 to line equipment 470 and line finder 480 to selector 490 and connector 130 which will be operated in response to these pulses. When the touch calling converter has completed its function, it signals the access and supervisory circuit 300 to switch the calling mobile user through to the called station, with the converter then releasing and returning to normal.

At the end of conversation the mobile subscriber depresses the disconnect button associated with the touch-calling keyset to cause a burst of disconnect tone to be transmitted to the base radio telephone terminal. Upon recognition of the disconnect tone the access and supervisory circuit 300 will release the associated line equipment 470, and restore the radio equipment to repeater type operation, marking the terminal idle to the associated attendant's cabinet 290.

The touch-calling converter referred to above is not a specific part of the present invention. Certain necessary modifications of conventional converters will be described in detail later. A converter providing the necessary facilities for converting touch-calling tone signals into conventional dial pulses is like that manufactured by Automatic Electric Company and referred to in their Bulletin C-1133. This unit recognizes tones and converts them into direct current pulses corresponding to the value of the digits dialed, with the pulses then outpulsed to the succeeding switch trains. The detailed operation of such a converter is not important in the present invention, however its ability to receive and provide certain supervisory signals will be described in detail later.

Figure 2:
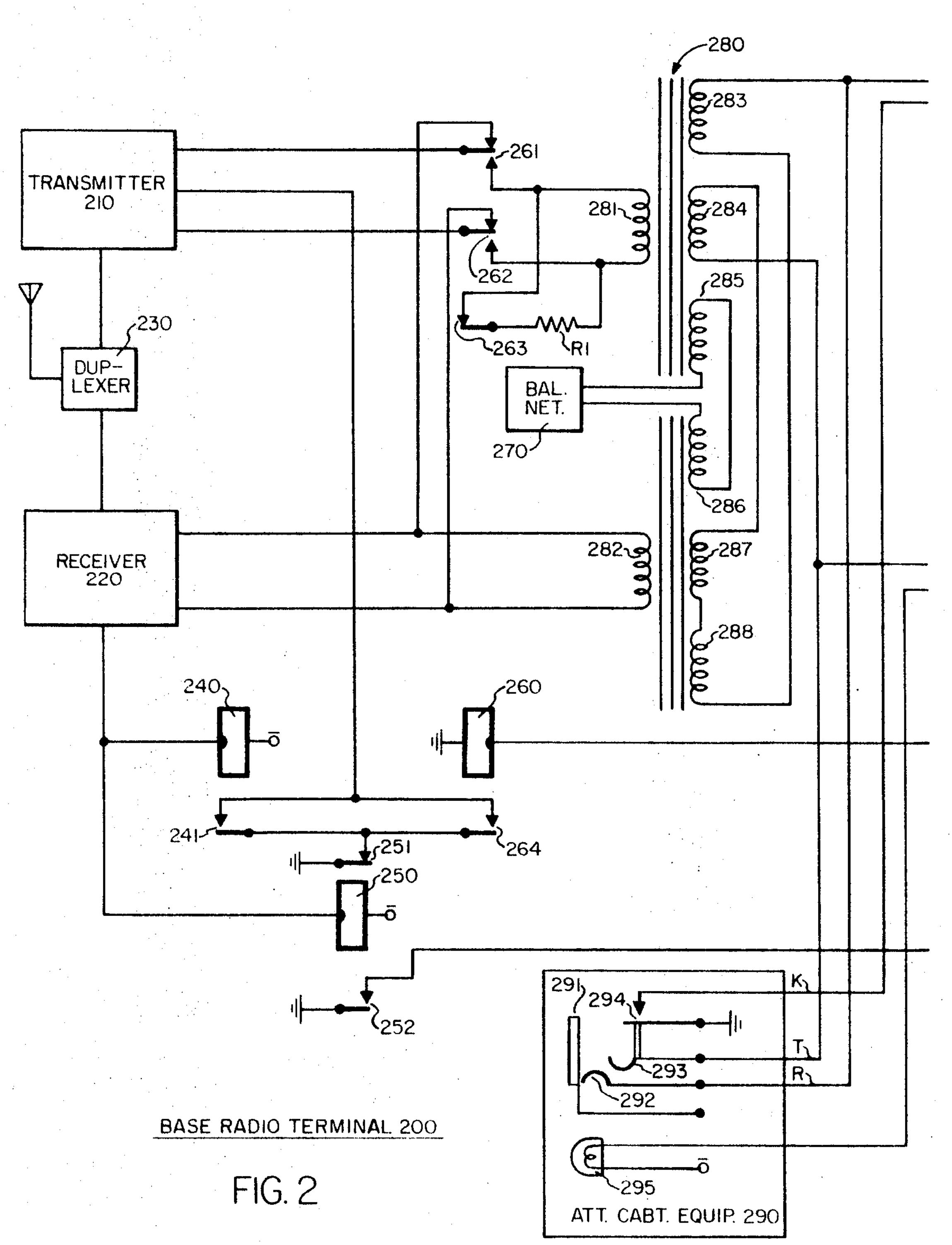
FIG. 2 is a combination schematic and block diagram of base station radio equipment and associated control relays for use in a communication system in accordance with the present invention.
Figure 3:
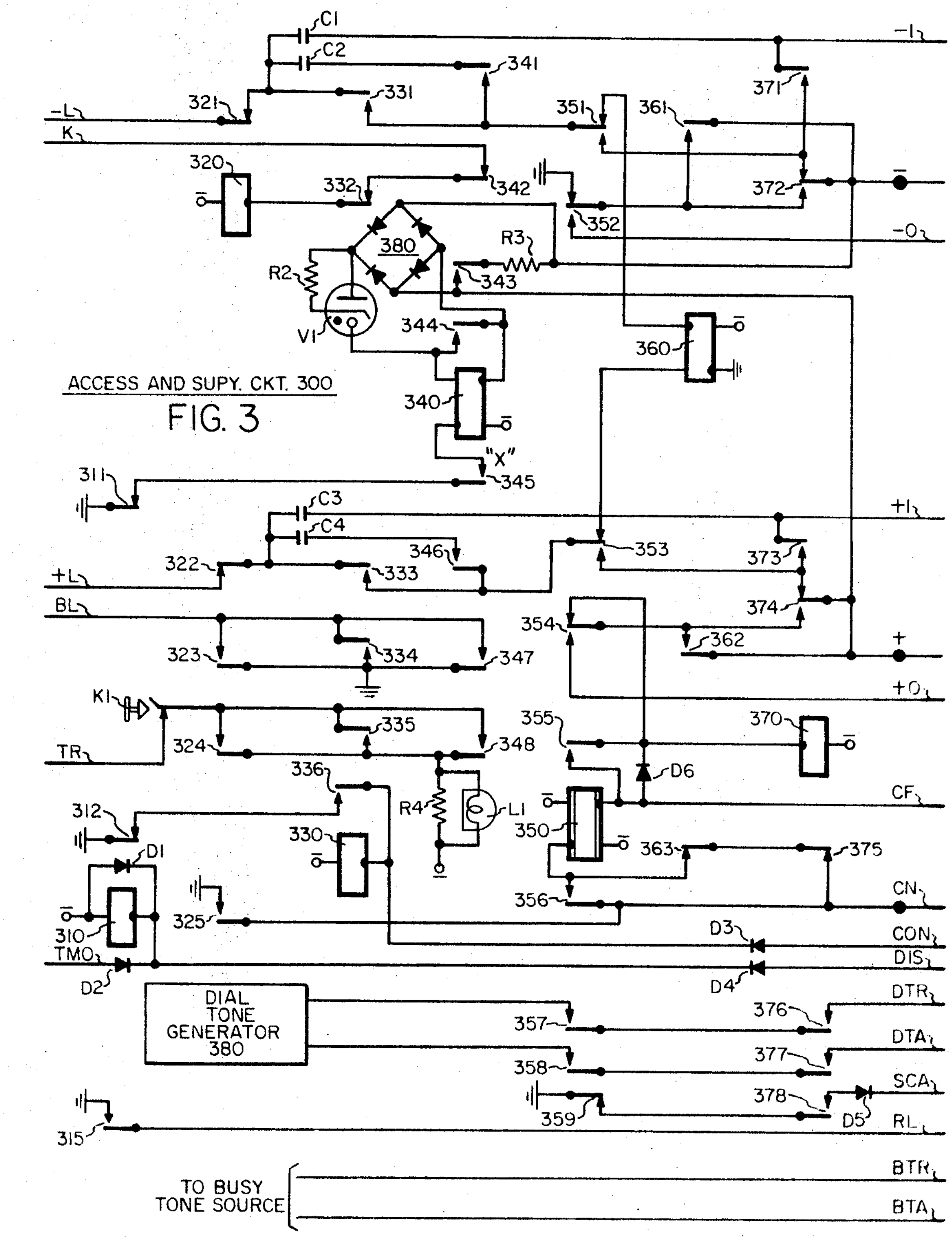
FIG. 3 is a schematic diagram of the access and supervisory circuitry employed in a mobile radio telephone terminal in accordance with the present invention.
Figures 4, 5:
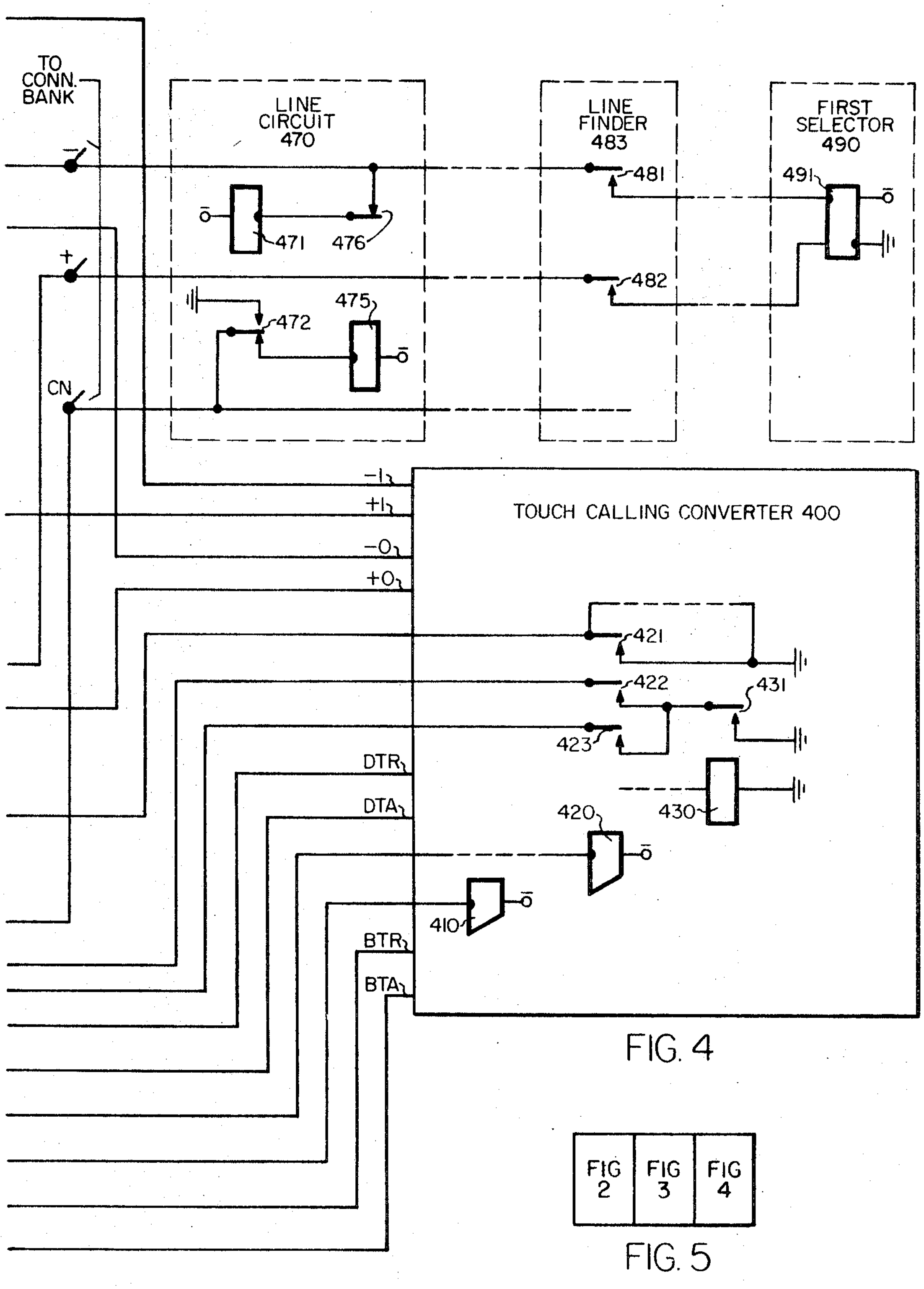
FIG. 4 is a schematic diagram of portions of an automatic telephone system connected to a mobile radio telephone terminal in accordance with the present invention and a partial schematic diagram of a touch-calling converter for use in the present system.
FIG. 5 is a drawing showing how

A better understanding of the operation of the present invention may be had by referring now to FIGS. 2, 3 and 4 taken in combination and arranged as shown in FIG. 5.

As noted previously the touch-calling converter 400 as shown in FIG. 4 is a standard touch-calling converter and may be similar to that manufactured by Automatic Electric Company under the designation H-850705--A99A. Those modifications necessary to enable its functioning in the present system are shown in FIG. 4. These modifications are necessary for proper interface with the access and supervisory circuit 300. A modification consists primarily of adding the "CON" and "DIS" leads as an output of the converter. The core reed conversion tree internal to the touch-calling converter is revised so as to derive the necessary circuit functions to provide these additional outputs, inasmuch as the touch-calling converter normally provides 10 output functions rather than the 12 required in the present system.

Several relays are shown as a portion of the base radio terminal 200, and while not forming a specific part of the present invention, their function will be described. Upon receipt of an incoming radio signal, relay 240 connected to receiver 220 operates and at its associated contacts 241 places a ground on transmitter 210 to place it in condition for operation. As noted previously the normal function of the receiver 220 and transmitter 210 in connection with mobile-to-mobile calls is that of a repeater. It can be determined by referring to the base radio terminal 200 circuitry that incoming signals from receiver 220 are coupled through the break contacts 261 and 262 of relay 260 to transmitter 210. Relay 260 operates in response to the access and the access and supervisory circuit 300 when the radio equipment is to be connected to the associated telephone system, by conducting at contacts 261 and 262 outgoing signals from the telephone equipment coupled through transformer 280 and secondary winding 281, to the transmitter 210. Incoming signals are coupled at winding 282 to the transformer 280 where they are further coupled to the access and supervisory circuit 300. Relay 250 acts as a "time-out" relay, operated to disconnect the transmitter in the event of loss of incoming carrier signal or alternatively operating in response to loss of voice signal after a predetermined period of time, thus removing the transmitter 210 from the transmit mode. Various types of base station radio equipment will all contain circuitry similar to that of the aforementioned relays 240, 250 and 260, however they may not exactly the particular arrangement shown. Equipment performing essentially the same functions is generally included in most base radio equipment.

Mobile to Land Connection

Initially the mobile radio user will operate the connect button on his touch-calling keyset transmitting a connect tone consisting of a combination of 941 Hz. and 1,209 Hz. signals. This will be received at the antenna of the base radio terminal 200 and conducted through the duplexer 230 to receiver 220, for further extension to primary winding 282 of transformer hybrid 280. By means of hybrid transformer 280 these signals will be conducted on the −L and +L leads to the access and supervisory circuit 300. Through contacts 321 and capacitor C1 the −L lead is capacitively coupled to the touch-calling converter 400 and similarly through contacts 322 and capacitor C3 and +L lead is connected to the touch-calling converter 400. These connections are made over leads designated −I and +I associated with the input to the touch-calling converter. As part of the preseizure circuit operation of the touch-calling converter, the internal receiver circuitry (not shown) detects these tones and places ground on lead CON.

Return of ground on lead CON through diode D3 operates relay 330. Relay 330 then locks in the operated mode, at its associated contacts 336, closing a loop via leads +L and −L to the upper and lower windings of relay 360. Operation of relay 330 also places resistance battery through resistance R4 at contacts 348 through to lead TR which returns the resistance battery, to relay 260 of the radio terminal equipment. Likewise operation of relay 330 also places ground at contacts 334 on lead BL extending to the busy lamp 295 that forms a portion of attendant cabinet equipment 290. The patch to relay 320 is opened at contacts 332 also in response to operation of relay 330.

Relay 360 operates placing ground on the − lead extending to line circuit 470 at contacts 361, and connects battery through relay 370 at contacts 362 to the + lead, the connection to relay 350 is also broken at contacts 363 in response to operation of relay 360.

With the placement of battery and ground on the − and + leads extending to line circuit 470, the associated line finder will be caused to operate in a well known manner to establish a connection to the − and + leads at contacts such as 481 and 482. Ground is now returned on the + lead causing operation of relay 370 over a path extending through contacts 362 and break contacts 354 to the coil relay 370. At this time relay 370 will operate placing ground at contacts 378 on lead SCA extending to the touch-calling converter 400. Ground on lead SCA causes seizure of the touch-calling converter.

When the touch-calling converter 400 has been seized and is prepared to accept digits, ground is returned through contacts 421 of relay 420 which was operated on seizure, over lead CF, completing an operating path to the upper winding of relay 350, likewise preparing a holding path for relay 370 via diode D6. Relay 350 now operates locking via its associated contacts 356 to ground on leads DN returned to the line circuit 470. Relay 350 also opens the operating path at contacts 351 and 353 to relay 360, causing it to restore, connecting the −L and +L lead to the −1 and +1 input leads of converter 400. The − and + leads extending to the line circuit are then connected at contacts 352 and 354 to the +0 and −0 output leads of touch-calling converter 400. At contacts 359 ground is removed from lead SCA and a path from the dial tone generator 380 is completed at contacts 357 and 358 to the touch-calling converter 400.

The mobile radio user now operates his touch-calling device in the usual manner transmitting tones representative of the calling number of the telephone with which he wishes to communicate. These tones are conducted through the previously outlined paths to the touch-calling converter 400 which in turn converts these tones into DC pulses for use in a local telephone system. These pulses are transmitted over leads −0 and +0 to the line circuit 470 and line finder 480, to a first selector such as 490 which is operated in the well known manner, in turn establishing a connection to an associated connector circuit (not shown) which will likewise be operated to gain access to the desired telephone station's line. If the station's line is not busy, ringing tone will be returned over the −L and +L leads, to the radio equipment and transmitted by transmitter 210 to the mobile radio user. Likewise if the telephone station is busy, busy tone will be returned.

Upon completion of outpulsing, touch-calling converter 400 removes ground from lead CF at its contacts 421 removing the holding ground from relay 370 causing it to restore and also removing ground the upper winding of relay 350. When relay 370 restores the + and − leads will be connected to the +L and −L leads respectively, and the +0 and −0 leads will be disconnected from the + and − leads extending to the switching equipment. Likewise the +1 and −1 leads will be disconnected from the +L and −L leads. As soon as the called telephone station answers conversation may commence.

Upon completion of the call, the mobile radio user sill operate the disconnect button associated with his touch-calling keyset, transmitting a tone consisting of 941 cycles and 1,477 cycles. This tone is received at the radio terminal and conducted via leads +and −L to the access and supervisory circuit. It is capacitively coupled in the circuit through capacitors C1 and C3 respectively to the −1 and +1 leads extending to touch-calling converter 400. Ground is now returned through contacts 431 and 423 in the touch-calling converter over lead DIS and conducted through diode D4 to the disconnect relay 310, causing it to operate. At its associated contacts 312 the holding ground is removed from relay 330 and ground is placed at contacts 315 on lead RL extending to the release relay 410 in the touch-calling converter 400. Because of diode D1 relay 310 is slow to release, after ground is removed from lead DIS upon release of the touch-calling converter 400. Relay 330 now restores opening the paths from +L and −L to + and − respectively, and removing the resistance battery from lead TR. At contacts 332 the operating path for relay 320 is restored.

When the line circuit 470 restores ground is removed from lead CN and relay 350 restores after its slow-to-release interval. All of the circuitry involved is now returned to normal.

Land to Mobile Connection

Assuming now that a telephone station user wishes to make a call to a mobile radio user, the user will gain access to the circuit 300 in the manner previously described, by dialing the connector terminal number identified with the supervisory and access circuit 300, and gaining access from the connector bank to the +, − and CN conductors. When it is seized ground is applied on the CN lead extending to the lower winding of relay 350. Relay 350 operates disconnecting battery at contacts 351, and ground at contacts 353 from the −L and +L leads respectively. When the preceding connector switch, through which access was gained switches through, in the well known manner, ringing current is sent forward over the + and − leads to diode bridge 380 where the alternating current is rectified and applied to gas tube VI causing it to fire. When gas tube VI fires and becomes conductive operating potential is provided to relay 340 causing it to operate at its "X" contacts 345 to complete an operating path to ground from the lower winding of relay 340 through contacts 311. Relay 340 now operates completely shunting at contacts 344 the winding over which it was initially operated. At contacts 348 it places resistance battery on lead TR, and at contacts 347 places ground on lead BL. At contacts 342 the operating path to relay 320 from lead K is broken and a capacitively coupled loop from leads +L and −L to leads + and − is completed at contacts 341 and 346.

The ring cutoff relay in the connector then operates in the usual manner over the low resistance path provided by gas tube VI, to remove the ringing current from the line. When the ringing current is removed from leads + and −, the gas tube VI will revert to its original high resistance path characteristic, preventing the connectors back bridge relay from operating when the loop is closed to it. Answer supervision however is not given at this time. The calling telephone station now has a voice path connection through leads −L and +L and transformer 280 of the radio terminal equipment, to the radio transmitter 210. The telephone user now pages the desired mobile unit.

When the mobile radio user answers, he operates the connect button at the associated touch-calling keyset in a manner previously described, to transmit connect tone. Upon receipt of connect tone relay 330 operates, shunting capacitors C3 and C4, at contacts 331 and 333, closing a DC loop from leads +L and −L to leads + and − respectively, and returning answer supervision through to the associated connector. Conversation may now commence.

The disconnect sequence as described earlier is identical except that when relay 310 operates, the locking path to relay 340 is opened at contact 311, causing relay 340 to restore. In addition to relay 340 restoring, relay 330 restores when ground is removed from lead CN removing operating potential from the lower winding of relay 350 after its slow-to-release interval. Relay 350 now restores and the access and supervisory circuit 300 now is at normal.

If an attendant at an attendant's cabinet that includes equipment 290 wishes to contact a mobile radio unit, she plugs in an appropriate cord into the jack that forms a part of the attendant cabinet equipment 290, placing ground at contact 294 of lead K. If the access and supervisory circuit is idle this ground will be conducted to relay 320 causing it to operate. Operation of relay 320 places ground at contact 325 on lead CN and resistance battery is placed on lead TR at contact 324. The battery and ground paths to the upper and lower windings of relay 320 at contacts 321 and 322, breaking them from the +L and −L leads. Ground is also forwarded on lead BL through contacts 323, and an operating path from ground through contacts 325, 375 and is completed to the lower winding of relay 350. Relay 350 then operates.

A path is now completed from the tip spring 293 and ring spring 292 of the jack circuit at the attendant cabinet 290 from the attendant's cord circuit to leads T and R which extend to leads +L and −L respectively, so that the attendant may now page the desired mobile radio user in the manner previously outlined.

When the operator disconnects, ground is removed from lead K with the opening of the spring contacts 294, so that relay 320 restores. At this time ground is removed at contact 325 from lead CN, and at contacts 323 from lead BL. Resistance battery is also removed at contacts 324, and the operating path to the lower winding of relay 350 is removed at contacts 325. After its slow-to-release interval relay 350 again restores with all circuitry returning to normal.

While a particular embodiment of the present system has been shown, it is for illustrative purposes only, and should not be construed as limiting the present invention. Rather the scope of the present invention is that set forth in the appended claims.

I claim:

1. A communication system comprising: a plurality of mobile radio units each equipped with a receiver, a transmitter and pushbutton operated tone generating means connected to said mobile unit transmitter, said mobile unit transmitter operated in response to manual operation of said tone generating means to transmit tone signals; a base station radio transmitter; a base station radio receiver; said base station receiver normally operated in response to receipt of voice signals from one of said mobile units to operate said base station transmitter to transmit said received voice signals to other ones of said mobile units; a plurality of individually numbered dial equipped telephone substations; automatic switching equipment, operable to establish circuit paths to selected ones of said substations in response to dial generated pulses; a tone signal converter, operable in response to receipt of tone signals corresponding to a substation number to convert said signals to pulses; and interface means connected between said switching equipment and said base station receiver, and including circuit connections to said tone signal converter, said interface means operated in response to receipt by said base station receiver of a first tone signal transmitted by one of said mobile units to complete a circuit connection from said interface means to said base station transmitter, and connect said tone signal converter to said switching equipment, and to operate said base station transmitter over said completed circuit connection between said interface means and said base station transmitter, to transmit a supervisory tone to said mobile radio units, signaling said mobile radio unit that transmitted said first tone signal, to transmit a plurality of second tones corresponding to a selected substation number; said tone signal converter operated in response to receipt by said base station receiver of said plurality of second tones transmitted by said mobile unit, to transmit a plurality of corresponding pulses to said switching equipment; said switching equipment operated in response to said pulses to establish a circuit path to said selected substation; and said interface means further operated to connect said base station receiver and said base station transmitter to said established circuit path.

2. A communication system as claimed in claim 1 wherein: said interface means are further operated in response to receipt by said base station receiver of a third tone signal transmitted by said one of said mobile units to break said circuit connection between said interface means and said base station transmitter and disconnect said tone signal converter from said switching equipment.

3. A communication system as claimed in claim 1 wherein said interface means include a plurality of relay means comprising: a first relay operated in response to receipt by said base station receiver of said first tone signal to connect said base station transmitter to said interface circuit; a second relay operated in response to said first relay to condition said switching equipment; a third relay operated in response to said conditioned switching equipment to condition said tone signal converter; a fourth relay operated in response to said conditioned tone signal converter to connect said base radio receiver to said conditioned tone signal converter and to restore said second relay; and in response to said tone converter transmitting a plurality of pulses corresponding to a selected substation number to said switching equipment, said third relay restored, to complete a circuit path to said selected substation, and connect said base station receiver and said base station transmitter to said completed circuit path.

4. A communication system as claimed in claim 3 wherein: said fourth relay is further operated to apply dial tone through said tone signal converter to said base station radio transmitter, for transmission to said mobile radio units.

5. A communication system as claimed in claim 3 wherein: there is further included a fifth relay, said fifth relay operated in response to receipt of a third tone transmitted by said mobile radio unit, to restore said first relay and disconnect said base radio transmitter from said interface circuit.

6. A communication system as claimed in claim 1 wherein: each of said mobile units further include a receiver; and said switching equipment further operated in response to dial pulses from one of said substations to complete a circuit connection from said substation to said interface means; said interface means further operated in response to completion of said circuit connection to complete a transmission path to said base station transmitter and from said base station receiver through said switching equipment to said substation.

7. A communication system as claimed in claim 6 wherein said interface means include: a first relay operated in response to said circuit connection being completed from said switching equipment to said interface means in response to dial pulses from one of said substations; and a second relay operated in response to operation of said first relay to connect said switching equipment to said base station radio transmitter, and to said base station radio receiver.